United States Patent [19]

Fausone et al.

[11] 3,872,398

[45] Mar. 18, 1975

[54] PROXIMITY SENSOR WITH ADJUSTABLE HYSTERESIS

[75] Inventors: Alfredo Fausone, Ivrea; Luigi Piglione, Cirie, both of Italy

[73] Assignee: Ing. C. Olivetti and C., S.p.A., Ivrea (Torino), Italy

[22] Filed: Sept. 25, 1973

[21] Appl. No.: 400,631

[30] Foreign Application Priority Data

Oct. 11, 1972 Italy ................................ 70194/72

[52] U.S. Cl. .................. 331/65, 328/5, 331/117 R, 340/258 C

[51] Int. Cl. ........................ G08c 21/00, H03b 5/12

[58] Field of Search........... 331/65, 117 R; 317/146; 324/3, 41; 328/5; 340/258 C

[56] References Cited

UNITED STATES PATENTS

| | | | |
|---|---|---|---|
| 3,469,204 | 9/1969 | Magyar et al. | 331/65 |
| 3,747,012 | 7/1973 | Buck | 331/65 |

*Primary Examiner*—Siegfried H. Grimm
*Attorney, Agent, or Firm*—Schuyler, Birch, Swindler, McKie & Beckett

[57] ABSTRACT

A proximity sensor for use e.g., as a position transducer or a strobe, for metal parts. The sensor utilizes the change in the equivalent parallel resistance of an oscillator circuit as the metal part is relatively moved toward and away from the oscillatory circuit. Ready adjustment of the sensitivity of the sensor is provided by the use of adjustable resistors connected to the oscillatory circuit.

2 Claims, 1 Drawing Figure

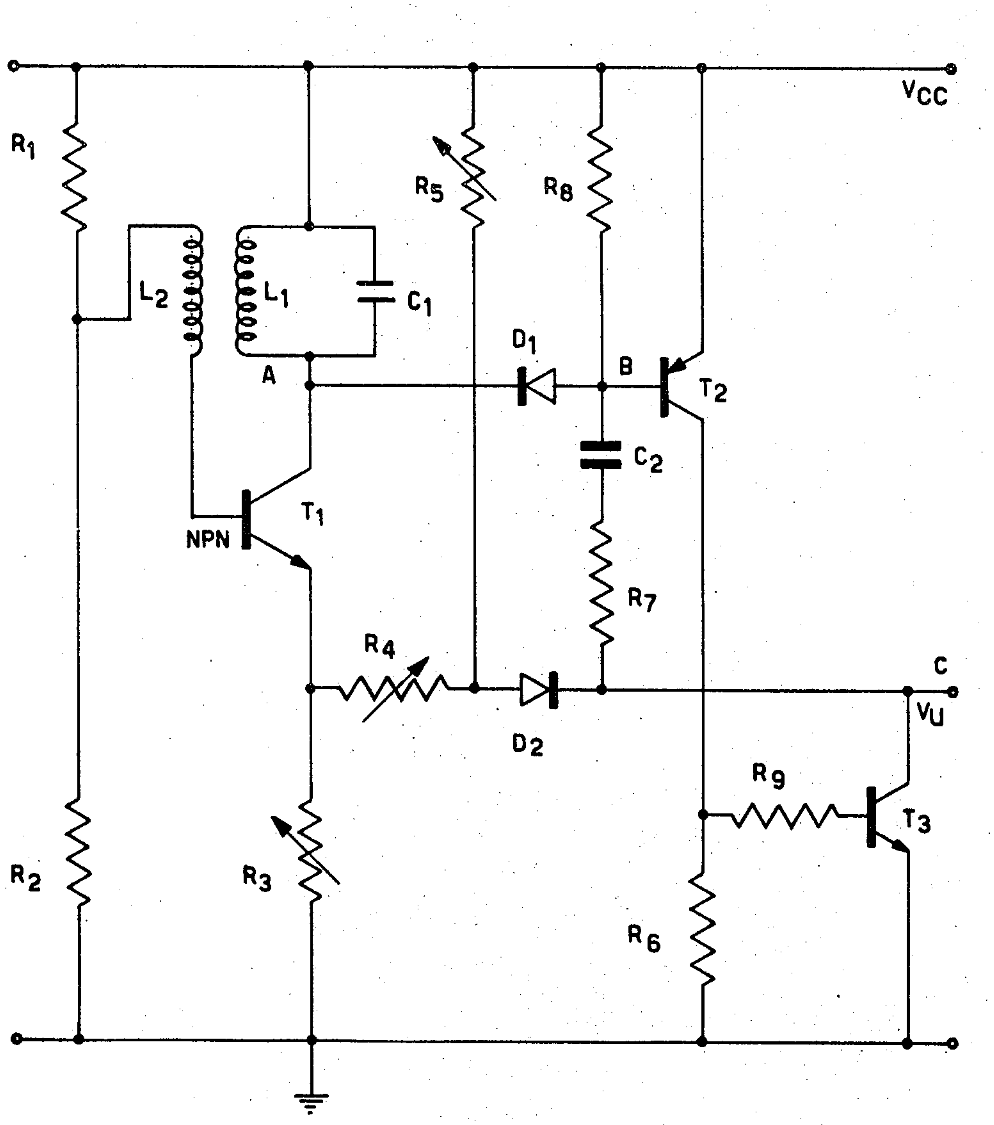
VCC
R1
R5
R8
L2
L1
C1
D1
B
T2
A
C2
T1
NPN
R7
R4
C
D2
VU
R9
T3
R2
R3
R6

PROXIMITY SENSOR WITH ADJUSTABLE HYSTERESIS

BACKGROUND OF THE INVENTION

This invention relates to a proximity sensor for indicating the relative location of a metal element with respect to the sensor.

DESCRIPTION OF THE PRIOR ART

Proximity sensors for detecting the presence or absence of a metal element in proximity to the sensor are known. Generally, the metal element to be sensed or detected operates to bias in one way or another an oscillatory circuit. For instance, the oscillatory circuit may be permitted to oscillate or may be prevented from oscillating, depending upon the position of the metal element. The oscillatory and non-oscillatory conditions or statuses are therefore used for the purpose of detecting or indicating the position of the element with respect to an inductance forming part of the oscillatory circuit.

As an illustration, the proximity sensor might be used either as a position transducer or as a strobe. When used as a position transducer, a different output voltage level is provided for the two different positions assumed by the metal element. When used as a strobe, an electrical pulse is provided to show the passage of a movable metal element in a unidirectional motion.

The known devices of the prior art of this type are characterized by a rather complex structure and by the impossibility of adjusting the sensitivity and the extent or magnitude of the switching hysteresis cycle of the magnetic circuit in a simple and readily determined way by operating exclusively upon the electrical parameters of the sensor.

SUMMARY OF THE INVENTION

It is a primary object of the present invention to avoid the disadvantages of the prior art proximity sensors.

More particularly, it is an object of this invention to provide for ready adjustment of the sensitivity of the sensor and of the amplitude of the switching hysteresis cycle thereof by simple adjustment of the electrical parameters of the sensor.

These and other objectives of the invention will now be more fully explained in conjunction with the drawing showing a preferred embodiment of the invention.

BRIEF DESCRIPTION OF THE DRAWINGS

In the drawing the single FIGURE is a schematic drawing of the electrical components of the sensor of the invention.

DETAILED DESCRIPTION OF THE INVENTION

Generally speaking, the proximity sensor of the drawing consists of an oscillator circuit or stage, a demodulating stage and an output stage. The oscillator circuit includes an inductance $L_1$ which is tuned by a capacitor $C_1$ to determine the frequency of the oscillating voltage developed by the oscillator circuit. The metal element whose presence or motion is to be sensed or detected is magnetically coupled to the inductance $L_1$, as well as to an inductance $L_2$ which is closely and regeneratively coupled with the inductance $L_1$, to supply a regenerative feedback voltage to the amplifier circuit of the oscillator.

The amplifier includes NPN transistor $T_1$. The collector of the transistor is connected through the tuned oscillator circuit or tank circuit $L_1$ $C_1$ to one terminal of a direct current voltage source $V_{CC}$. The other terminal of the d-c voltage source is connected to ground. The emitter of transistor $T_1$ is connected through a variable or adjustable resistor $R_3$ to ground. The junction between resistor $R_3$ and the emitter of transistor $T_1$ is connected to the ungrounded terminal of the voltage source, $V_{CC}$ through the series combination of a variable resistor $R_4$ and a variable resistor $R_5$. Resistors $R_3$, $R_4$ and $R_5$ of course form a voltage divider connected across the d-c voltage source and determine the emitter resistance, as well as the emitter bias voltage.

The base of transistor $T_1$ is connected to a second voltage divider by the inductance $L_2$. This second divider is composed of the series combination of resistors $R_1$ and $R_2$, connected across the d-c source $V_{CC}$. The terminal of inductance $L_2$ remote from the base of transistor $T_1$ is connected to an intermediate point of this second voltage divider. It will be appreciated that the voltage divider could be formed of a potentiometer, with the movable tap thereof connected to inductance $L_2$. In any event, the base bias voltage is determined by the relative resistances of resistors $R_1$ and $R_2$ and may be selected to control the amplitude of oscillations furnished by the oscillator circuit.

The transformer ratio t of the transformer formed by the inductances $L_1$ and $L_2 = N1/N2$, where N1 is the number of turns of the inductance $L_1$, and N2 is the number of turns of inductance $L_2$. The equivalent parallel resistance of the oscillator circuit formed of the inductances $L_1$ and $L_2$ and the capacitor $C_1$ may be indicated by the designation $R_p$. The equivalent resistance seen by the emitter of transistor $C_1$ is indicated by the designation $R_e$.

The equivalent parallel resistance of the oscillator circuit $R_p$ is of course determined in part by the position of the metallic element which is being sensed. That is, the resistance $R_p$ includes the circuit loss by reason of currents flowing in the metal element by induction from the oscillatory circuit. When the metal element is in close proximity to inductance $L_1$ the loss is greater and therefore the value of $R_p$ is smaller than when the metal element is distant from the oscillator circuit. The value of resistance $R_p$ does not depend upon the speed or direction of movement of the metal element but only upon the distance thereof from the inductance $L_1$.

The characteristics of the oscillator circuit including the amplifier $T_1$ are selected in such manner that when the metal element is farther than a predetermined distance from inductance $L_1$, the equivalent parallel resistance $R_p$ has a value such that the ratio $R_p/R_e$ multiplied by the reciprocal of the transformer ratio is greater than 1. That is, $R_p/R_e \cdot 1/t > 1$.

At this time, with a transistor gain greater than the transformer ratio, the oscillator circuit is in oscillation and an oscillating voltage is supplied by the oscillator circuit. The point A, which is the junction between the collector of transistor $T_1$ and the tuned circuit $L_1C_1$, therefore varies in voltage in a sinusoidal manner with the average value equalling the source voltage. The amplitude of the excursion of sinusoidal voltage from the average may be set to a suitable value by selection of the relative magnitudes of the resistors $R_1$ and $R_2$.

The point A is connected to the base of the demodulator stage transistor $T_2$, which is of the PNP type, through a diode $D_1$. The amplitude of the oscillatory voltage is selected to be such as to exceed the threshhold level of the diode $D_1$ during at least a portion of the negative excursion of the oscillator voltage and therefore the base of the transistor $T_2$ will see a negative voltage at that time. The amplitude of the drive is such as to cause the saturation of transistor $T_2$, which acts as a switch. During the remaining portion of the oscillator voltage cycle, the base of transistor $T_2$ is cut off from the oscillator circuit by reason of the polarity of diode $D_1$ which has a recovery period which is essentially negligible. The circuit elements are so chosen that the charge stored in the junction of transistor $T_2$ holds the transistor in saturated condition until the next following negative half cycle of the oscillator voltage, so that the transistor $T_2$ remains saturated so long as the oscillator circuit is supplying an output oscillating voltage at point A.

The base of transistor $T_2$ is connected to the d-c voltage source $V_{CC}$ by resistor $R_8$. The emitter of transistor $T_2$ is connected to the same terminal of the voltage source and the collector is connected to the grounded terminal of the source through a resistor $R_6$.

The junction between resistor $R_6$ and the collector of transistor $T_2$ is connected to the base of an NPN output transistor $T_3$ through a resistor $R_9$. The emitter of transistor $T_3$ is connected to the grounded side of the d-c voltage source, while the collector of transistor $T_3$ is connected to output terminal C. The other output terminal is connected to ground.

The transistor $T_3$ operates like a switch, as does the transistor $T_2$, and it is driven into a saturated condition whenever the transistor $T_2$ is saturated.

The operation of the circuit of the invention is such that the voltage $V_U$ appearing between the output terminals of the circuit is substantially equal to zero when the transistors $T_2$ and $T_3$ are saturated, and therefore when the oscillator circuit is in oscillation.

A regenerative feedback circuit is provided between transistor $T_3$ and transistor $T_2$. This circuit includes the series combination of resistor $R_7$ and capacitor $C_2$ connected between the collector of transistor $T_3$ and the base of transistor $T_2$. The feedback connection avoids uncertainty which might be occasioned by variation in the amplitude of the oscillator voltage and operates such that when the transistors $T_2$ and $T_3$ are turned on, they remain on throughout a time period which is four times the time constant of the R-C circuit $R_7C_2$. This time constant is preferably selected such that the time is sufficiently long for actuation of the switching hysteresis circuit and sufficiently short to permit the use of a high repetition rate for the switching cycle.

The operation of the circuit when the oscillator provides an oscillating voltage has been described above. When the metal element whose position is being sensed is moved closer to the inductance $L_1$, the magnetizing force achieves greater excursions because the metal element is exposed to greater variable magnetization, with a consequent increase in induced current therein. The effect is a decrease in the equivalent parallel resistance $R_p$. When the metal element assumes a position close enough to the inductance $L_1$, the ratio between the equivalent parallel resistance $R_p$ and the equivalent emitter resistance $R_e$ multiplied by the reciprocal of the transformer ratio becomes less than 1 ($R_p/R_e$ 1/t < 1) and the oscillatory voltage is damped.

At this time the point A is essentially at the potential of the d-c source $V_{CC}$ and the transistor $T_2$ is cut off. With demodulating transistor $T_2$ cut off, output transistor $T_3$ is cut off so that the output voltage $V_U$ is essentially equal to the d-c source voltage.

The switching threshhold of the system may be adjusted by adjustment of the elements which cooperate together to form the emitter resistance $R_e$ as will now be explained.

The amplitude of hysteresis curve of the switching circuit of the sensor is determined by the values of the resistors $R_3$, $R_4$ and $R_5$, together with the operation of the diode $D_2$ connected between the output terminal C and the junction between resistors $R_4$ and $R_5$. The diode $D_2$ does not conduct when the metal element whose position is being sensed is close to the inductance $L_1$ and the output voltage $V_U$ is high ($V_U$=$V_{CC}$). At this point the emitter of transistor $T_1$ is in effect connected to a terminal point of a dipole element formed of a voltage source $E=V_{CC}R_3/R_3+R_4+R_5$, and a resistance $R'_{eq} = R_3(R_4+R_5)/R_3+R_4+R_5$.

In the inverse case, with the metal element sufficiently remote from the inductance $L_1$, the output voltage $V_U$ is essentially zero ($V_U$=0). At this time the diode $D_2$ conducts and the emitter of transistor $T_1$ is in effect connected to a resistance which is determined by the parallel combination of $R_3$ and $R_4$. That is, $R'_{eq} = R_3R_4/R_3+R_4$.

The values of the resistors $R_3$, $R_4$ and $R_5$ may be so adjusted that the emitter resistance has a lower value when the metal element is close to inductance $L_1$ and therefore that the gain of transistor $T_1$ is greater at that time but is unchanged under other conditions.

If the metal element is sufficiently spaced from inductance $L_1$, the ratio $R_p/R_e$ is greater than $t$, as described above, and the equivalent emitter resistance $R_e$ takes a value $R''_{eq}$ and oscillations occur in the oscillator circuit.

When the metal element is moved closer to inductance $L_1$ in any direction, the value of the equivalent parallel resistance $R_p$ is decreased progressively. When the metal element reaches a spacing $d_1$ from the inductance $L_1$, the ratio $R_p/R''_{eq} = t$. This is the threshhold of operation of the system. When the metal element is moved even closer to inductance $L_1$, this threshhold is surpassed and oscillation in the oscillator circuit is prevented, so that the output is switched to the voltage $V_U$=$V_{CC}$.

If the metal element is then moved away from inductance $L_1$ in any direction, oscillation begins at a distance $D_2$ between the metal element and the inductance at which the ratio between the equivalent parallel resistance $R_p$ and the equivalent emitter resistance Re equals the transformer ratio $t$. At this time the equivalent emitter resistance $R_e$ has the value of R'eq.

By adjustment of the resistors $R_3$, $R_4$, $R_5$ such as to make the equivalent resistance R'eq greater than the equivalent resistance R''eq. the tripping condition ratio $Rp/R'_{eq} > t$ is reached when the metal element is at a distance $D_2$ from the inductance $L_1$ which is greater than the distance $d_1$. This is achieved without any change in the other conditions. The distances of spacing of the metal element from the inductance $L_1$, namely $d_1$ and $D_2$, and thus also the amplitude of the switching hysteresis cycle are functions of the resistance of the resistors $R_3$, $R_4$ and $R_5$. When these resistance values are changed, different sensitivities of the proximity sensor are obtained. That is, the distances of spacing of the metal element from the inductance $L_1$ at which the electronic circuit is switched are changed when the values of the resistors $R_3$, $R_4$ and $R_5$ are changed.

In similar fashion, change in these same resistance values causes a change in the amplitude of the switching hysteresis cycle. On the other hand, the amplitude of the oscillatory voltage is determined by the values of the resistors $R_1$ and $R_2$ and not by resistors $R_3$, $R_4$ and $R_5$.

It will be appreciated that the circuit of the invention may be constructed with discrete components, as well as with a hybrid arrangement. In both cases the resistors of the sensor may be adjusted by known techniques.

The invention has been described in conjunction with a preferred embodiment thereof in conjunction with the accompanying drawing. It will be appreciated that modifications of the preferred embodiment may be made without departure from the scope of the invention. Accordingly, the scope of the invention is not to be considered limited by the described preferred embodiment but rather only by the scope of the appended claims.

We claim:

1. A proximity sensor responsive to the relative change in location of a metal element comprising:

an oscillator circuit including an inductance for inductive coupling with the metal element, a transistor amplifier and a direct current voltage source for furnishing operating voltages to the elements of the transistor, the collector of said transistor being connected to one terminal of said voltage source through said inductance, a capacitor connected across said inductance, a first resistor voltage divider connected across said source and having an intermediate point connected to the emitter of said transistor to determine the emitter resistance of said transistor, a second resistor voltage divider connected across said voltage source, the base of said transistor being regeneratively coupled to said inductance and being connected to an intermediate point of said second voltage divider, said oscillator being operable to furnish an oscillating voltage output responsive to change in location of the metal element, a demodulating stage connected to said oscillator to supply an output voltage of amplitude determined by the oscillating voltage output of the oscillator circuit, an output stage, each of said demodulating and output stages including a transistor, a first diode connected between the base of the demodulating transistor and the collector of the oscillator transistor, the base of the output transistor being connected to the collector of the demodulating transistor, a pair of output terminals respectively connected to the collector and emitter of the output transistor, and a regenerative feedback connection between the collector of the output transistor and the base of the demodulating transistor, and, means for adjusting the sensitivity of said oscillator circuit to relative change in location of the metal element comprising at least one variable resistance element in said first voltage divider which establishes emitter resistance of said oscillator transistor.

2. The apparatus of claim 1 in which said first resistor voltage divider includes first, second and third resistors serially connected across said voltage source, the junction between the first and second resistors being connected to the emitter of the oscillator transistor, and a second diode connected between the collector of the output transistor and the junction between said second and third resistors, said second diode being poled to block conduction when the oscillator circuit is furnishing an oscillating voltage.

* * * * *